UNITED STATES PATENT OFFICE 2,341,687

MANUFACTURE OF THIAZOLES

William Robert Boon, Blackley, Manchester, England, assignor to Imperial Chemical Industries Limited, a corporation of Great Britain No Drawing. Application November 17, 1941, Serial No. 419,505. In Great Britain December 4, 1940

14 Claims. (Cl. 260—302)

The present invention relates to the manufacture of thiazoles which are useful as intermediates in the manufacture of pharmacologically active substances.

More particularly it relates to the manufacture of thiazole-2-carboxylic esters which are substituted in position 4 and optionally also in position 5, and to the manufacture thence, by saponification and decarboxylation, of the corresponding substituted thiazoles.

According to the invention an alkyl thiooxamate of the formula NH₂—CS—CO—O—R is caused to interact with an alpha-halogeno-ketone, R'—CH Hal—CO—R'', (Hal stands for chlorine, bromine, or iodine) whereby there is obtained in a technically advantageous manner a thiazole carboxylic ester of the formula

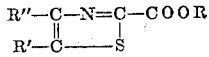

In these formulae R stands for alkyl and R' and R'' stand for alkyl or substituted alkyl groups or also R' may stand for a hydrogen atom.

The substituted thiazole-2-carboxylic esters of the formula given are new compounds.

The interaction is conveniently brought about by heating the thiooxamate and the halogenoketone together, preferably in presence of an acid-binding agent and, optionally, also in presence of a solvent or diluent.

As suitable ketones R'—CHHal—CO—R'' there may be mentioned chloroacetone, ethyl α-bromoethyl ketone, and, of particular interest, 3-chloro- or 3-bromo-5-hydroxypentan-2-one (see British Specification No. 472,396) and the carboxylic esters thereof, for example 3-aceto-3-chloropropyl-(1) acetate.

As suitable alkyl thiooxamates there may be mentioned, for example, methyl, ethyl and isobutyl thiooxamates.

As acid-binding agents there may be used, for example, chalk or magnesium oxide. Strong alkalies such as caustic soda are preferably avoided as they may decompose the halogeno-ketone.

Methanol, ethanol, acetone and benzene are suitable as solvents or diluents, but other organic liquids which do not react with either the starting materials or the products may be used.

By a further feature of the invention the thiazole carboxylic ester is hydrolysed by methods known per se, whereby the radical R is replaced by hydrogen, forming the corresponding carboxylic acid. Also, in many cases simultaneously, and in others upon gentle heating, there is an elimination of carbon dioxide, whereby there is formed the thiazole of the formula

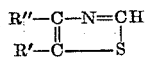

wherein R' and R'' have the same meanings as before.

In this way when 3-chloro- or 3-bromo-5-hydroxypentan-2-one is used, there is obtained 4-methyl-5-β-hydroxyethylthiazole of the formula

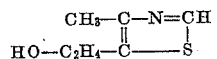

which is an intermediate for vitamin B₁, otherwise known as Aneurin.

Similarly, when a carboxylic ester of a 3-halogeno-5-hydroxypentan-2-one is used, there is again obtained 4-methyl-5-β-hydroxyethylthiazole because the hydrolysis treatment affects both the esterified carboxy group in the 2-position and the acylated β-hydroxyethyl group in the 5-position.

The hydrolysis of the ester is conveniently brought about by heating with aqueous alkali, for example aqueous caustic soda, and the decarboxylation of the resulting acid by heating with a dilute mineral acid, for example hydrochloric acid. It is also possible to bring about both the hydrolysis and the decarboxylation in a single technical operation, by heating with dilute mineral acid. In this case more acid is used than where it is merely required to bring about decarboxylation.

The invention is illustrated but not limited by the following examples in which the parts are by weight.

Example 1

54 parts of ethyl monothiooxamate, 38 parts of chloroacetone, 25 parts of chalk and 50 parts of ethanol are heated together under a reflux condenser for 4 hours; the mixture is then diluted with 100 parts of ether, shaken with 200 parts of water and filtered. The ethereal layer is separated off, the aqueous layer is then extracted with a further 50 parts of ether and the ether extracts are united. After drying the ethereal solution over anhydrous potassium carbonate the ether is distilled off and the residue is distilled under sub-atmospheric pressure. 35 parts of ethyl-4-methylthiazole-2-carboxylate of B. P. 132° C. at 10 mm. are obtained. On shaking with water ethyl-4-methylthiazole-2-carboxylate yields a crystalline hydrate of M. P. 33–34° C.

The ester gives on hydrolysis with dilute caustic soda a quantitative yield of 4-methylthiazole, thus: 10 parts of ethyl-4-methylthiazole-2-carboxylate, 20 parts of ethanol and 13.5 parts of 32% aqueous caustic soda liquor are heated under a reflux condenser for 5 hours. On cooling to 20° C. and adding an excess of hydrochloric acid there is a brisk evolution of carbon dioxide. The acid solution is evaporated to dryness, dissolved in 50 parts water and treated with a hot saturated solution of 17 parts of sodium picrate in water which precipitates 19.3 parts of 4-methylthiazolepicrate of M. P. 175° C.

*Example 2*

50 parts of ethyl monothiooxamate, 60 parts of 3-bromo-3-acetopropanol-1, 30 parts of chalk and 200 parts of ethanol are heated together under a reflux condenser for 15 hours. The mixture is then diluted with 100 parts of ether, shaken with 200 parts of water, made alkaline with soda ash to decompose a double compound formed by the thiazole-carboxylic ester and the calcium bromide and filtered. The ethereal layer is evaporated off, the aqueous layer is then extracted with a further 75 parts of ether and the ether extracts are united. After drying the ethereal solution over anhydrous sodium sulphate the ether is distilled off and the residue is distilled under sub-atmospheric pressure. 25 parts of ethyl - 4 - methyl - 5 - β - hydroxyethylthiazole-2-carboxylate of B. P. 174° C. at 1.8 mm. are obtained.

The ester gives an hydrolysis with dilute caustic soda a quantitative yield of 4-methyl-5-β-hydroxyethylthiazole, thus: 21.5 parts of ethyl 4-methyl - 5 - β - hydroxyethylthiazole - 2 - carboxylate, 25 parts of ethanol and 33 parts of 32% aqueous caustic soda are heated under a reflux condenser for 3 hours. The reaction mixture is then diluted with 150 parts of water and an excess of hydrochloric acid is added. On warming to 80° C. there is a brisk evolution of carbon dioxide. Decarboxylation is completed by boiling for 3 hours under a reflux condenser. The acid solution is now cooled, basified with an excess of 32% aqueous caustic soda and extracted with ether. The ethereal extract is dried over anhydrous potassium carbonate, the ether is distilled off and the residue is distilled at sub-atmospheric pressure whereby there are obtained 14 parts of 4 - methyl - 5 - β - hydroxyethylthiazole of B. P. 138° C. at 10 mm.

Alternatively, the hydrolysis and decarboxylation can be effected in one step if the ethyl-4-methyl - 5 - β - hydroxyethylthiazole - 2 - carboxylate is heated under a reflux condenser for 5 hours with 5 times its weight of 20% hydrochloric acid.

*Example 3*

50 parts of ethyl monothiooxamate, 67 parts of 3-chloro-3-acetopropyl acetate and 20 parts of chalk are heated with stirring at 140-150° C. for 3 hours. The reaction mixture is cooled, diluted with 150 parts of ether, shaken with 100 parts of water and filtered. The ethereal solution is dried over anhydrous sodium sulphate, the ether distilled off and the residue distilled at sub-atmospheric pressure whereby there are obtained 30 parts of ethyl 4-methyl-5-β-acetoxyethylthiazole-2-carboxylate of B. P. 165° C. at 1 mm.

The hydrolysis and decarboxylation of ethyl 4 - methyl - 5 - β - acetoxyethylthiazole - 2 - carboxylate is effected in exactly the same manner as is described in Example 2 for ethyl 4-methyl-5-β-hydroxyethylthiazole-2-carboxylate.

As many apparently widely different embodiments of this invention may be made without departing from the spirit and scope thereof, it is to be understood that the invention is not limited to the specific embodiments hereinbefore described, but only as defined in the appended claims.

I claim:

1. Process for the manufacture of new thiazole-2-carboxylic esters of the formula

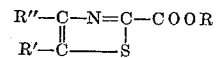

wherein R stands for alkyl, R' and R'' stand for alkyl groups, which comprises causing an alkyl thiooxamate of the formula $$NH_2-CS-CO-O-R$$

to interact with and α-halogen-ketone of the formula R'—CH Hal—CO—R'', where R, R' and R'' have the same meanings as before and Hal stands for a number selected from the class consisting of chlorine, bromine and iodine.

2. Process as claimed in claim 1 wherein the halogeno-ketone used is a 3-halogeno-5-hydroxypentan-2-one.

3. Process for the manufacture of thiazoles of the formula

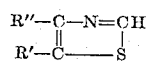

wherein R' and R'' stand for alkyl groups, which comprises hydrolysing the thiazole-2-carboxylic esters of the formula given in claim 1 and decarboxylating the thiazole-2-carboxylic acids so obtained.

4. Process as claimed in claim 3 wherein the hydrolysis and decarboxylation are brought about simultaneously by heating the thiazole-2-carboxylic ester with a dilute mineral acid.

5. Process as claimed in claim 3 wherein the thiazole-carboxylic ester which is subjected to hydrolysis and decarboxylation is an alkyl 4-methyl - 5 - β - hydroxyethylthiazole - 2 - carboxylate.

6. Process as claimed in claim 3 wherein the thiazole-carboxylic ester which is subjected to hydrolysis and decarboxylation is an alkyl 4-methyl - 5 - β - acyloxyethyl - thiazole - 2 - carboxylate.

7. Process for the manufacture of thiazoles of the formula

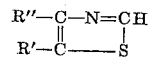

wherein R' and R'' stand for alkyl groups, which comprises causing an alkyl thiooxamate of the formula $NH_2-CS-CO-O-R$ to interact with an α-halogeno-ketone of the formula $$R'CH\ Hal-CO-R''$$

where R, R' and R'' have the same meanings as before and Hal stands for a member selected from the class consisting of chlorine, bromine and iodine, and subsequently subjecting the thiazole-2-carboxylic ester so obtained to hydrolysis and decarboxylation.

8. Process for the manufacture of 4-methyl-5-β-hydroxyethylthiazole which comprises causing an alkyl thiooxamate to interact with a 3-halogeno - 5 - hydroxypentan - 2 - one and subsequently subjecting the alkyl 4-methyl-5-β-hydroxyethylthiazole-2-carboxylate so obtained to hydrolysis and decarboxylation.

9. Process for the manufacture of 4-methyl-5-β-hydroxyethylthiazole which comprises causing an alkyl thiooxamate to interact with a carboxylic ester of a 3-aceto-3-halogenopropanol-1 and subsequently subjecting the alkyl 4-methyl-5-β-acyloxyethylthiazole-2-carboxylate so obtained to hydrolysis and decarboxylation.

10. New thiazole-2-carboxylic esters of the formula

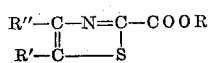

wherein R stands for alkyl, R′ and R″ stand for alkyl groups.

11. An alkyl 4 - methyl - 5 - β - hydroxyethyl-thiazole-2-carboxylate.

12. An alkyl 4 - methyl - 5 - β - acyloxyethyl-thiazole-2-carboxylate.

13. Ethyl 4 - methyl - 5 - β - hydroxyethyl-thiazole-2-carboxylate.

14. Ethyl 4 - methyl - 5 - β - acetoxyethyl-thiazole - 2 - carboxylate.

WILLIAM ROBERT BOON.